United States Patent
Kelley et al.

[11] Patent Number: 6,080,501
[45] Date of Patent: Jun. 27, 2000

[54] FUEL CELL WITH INTEGRAL FUEL STORAGE

[75] Inventors: Ronald J. Kelley, Coral Springs; Steven D. Pratt, Plantation; John K. Arledge, Ft. Lauderdale; Sivakumar Muthuswamy, Plantation; James L. Davis, Parkland, all of Fla.

[73] Assignee: Motorola, Inc., Schaumburg, Ill.

[21] Appl. No.: 09/106,339

[22] Filed: Jun. 29, 1998

[51] Int. Cl.[7] .................................................. H01M 8/10
[52] U.S. Cl. ........................ 429/31; 429/30; 429/33; 429/218.2
[58] Field of Search ................................ 429/30, 31, 33, 429/57, 59, 218.2

[56] References Cited

U.S. PATENT DOCUMENTS

| | | | |
|---|---|---|---|
| 5,314,762 | 5/1994 | Hamada et al. | 429/37 |
| 5,458,784 | 10/1995 | Baker et al. | 210/674 |
| 5,458,989 | 10/1995 | Dodge | 429/31 |
| 5,653,951 | 8/1997 | Rodriguez et al. | 423/439 |

*Primary Examiner*—Kathryn Gorgos
*Assistant Examiner*—W. T. Leader
*Attorney, Agent, or Firm*—Dale W. Dorinski

[57] ABSTRACT

A fuel cell (30) has an internal fuel source (35) that is in a matrix around a membrane electrode assembly (29). The membrane electrode assembly is constructed to be generally formed in the shape of a solid cylinder. The fuel cell has a porous central core (22) of reticulated vitreous metal that is formed in the shape of a solid cylinder. The porous central core serves to distribute oxidant throughout the fuel cell. A cathode (23) is situated coaxially around the porous central core, and has a catalytic layer on the outer side. A solid polymer electrolyte (25) is situated coaxially around the cathode and in intimate contact with the catalytic layer. An anode (27) is situated coaxially around the electrolyte, and a second layer of catalytic material is situated between the electrolyte and the anode. A housing (31) contains the internal fuel supply and holds the membrane electrode assemblies in place.

18 Claims, 2 Drawing Sheets

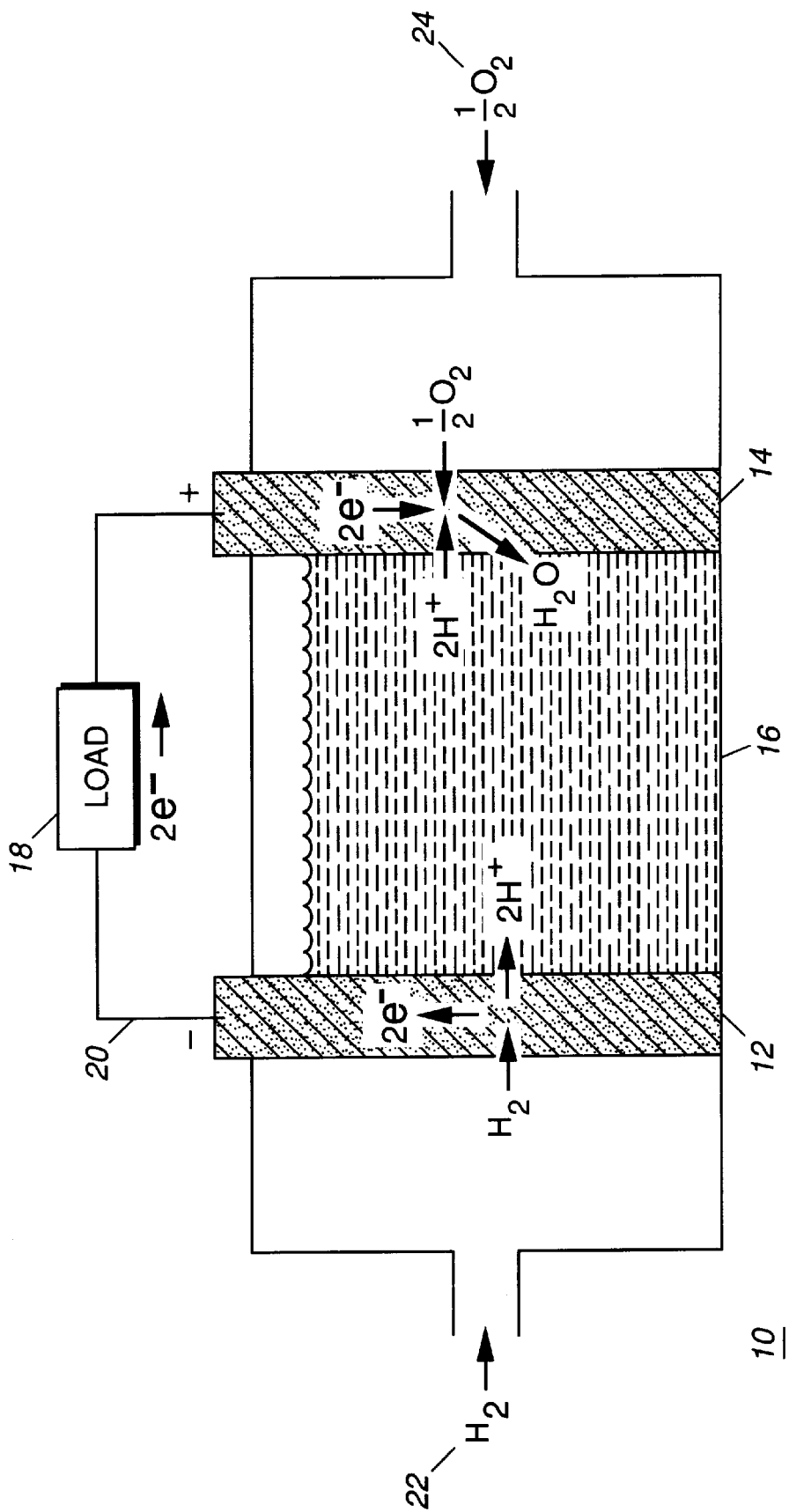
FIG. 1 *(PRIOR ART)*

FUEL CELL WITH INTEGRAL FUEL STORAGE

CROSS REFERENCE TO RELATED APPLICATIONS

This application is related to pending U.S. application Ser. No. 09/055,415, filed Apr. 6, 1998, pending, by Muthuswamy, et al., entitled "High Pressure Coaxial Fuel Cell," and assigned to Motorola, Inc.

FIELD OF THE INVENTION

This invention relates generally to fuel cells, and more particularly to fuel cells having the fuel stored internally to the cell.

BACKGROUND OF THE INVENTION

Fuel cells are electrochemical cells in which a free energy change resulting from a fuel oxidation reaction is converted into electrical energy. As shown in FIG. 1, a typical fuel cell 10 consists of a fuel electrode (anode) 12 and an oxidant electrode (cathode) 14, separated by an ion-conducting electrolyte 16. The electrodes are connected electrically to a load (such as an electronic circuit) 18 by an external circuit conductor 20. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. In theory, any substance capable of chemical oxidation that can be supplied continuously (as a gas or fluid) can be oxidized galvanically as the fuel 13 at the anode 12 of a fuel cell. Similarly, the oxidant 15 can be any material that can be reduced at a sufficient rate. Gaseous hydrogen has become the fuel of choice for most applications and the most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as efficient as possible. The electrodes must be electronic conductors, and possess the appropriate reactivity to give significant reaction rates. The most common fuel cells are of the hydrogen-oxygen variety that employ an acid electrolyte. At the anode 12, incoming hydrogen gas 13 ionizes to produce hydrogen ions and electrons. Since the electrolyte is a non-electronic conductor, the electrons flow away from the anode via the metallic external circuit. At the cathode 14, oxygen gas 15 reacts with the hydrogen ions migrating through the electrolyte 16 and the incoming electrons from the external circuit to produce water as a byproduct. Depending on the operating temperature of the cell, the byproduct water may enter the electrolyte, thereby diluting it and increasing its volume, or be extracted through the cathode as vapor. The overall reaction that takes place in the fuel cell is the sum of the anode and cathode reactions; in the present case, the combination of hydrogen with oxygen to produce water, with part of the free energy of reaction released directly as electrical energy. The difference between this available free energy and the heat of reaction is produced as heat. It can be seen that as long as hydrogen and oxygen are fed to the fuel cell, the flow of electric current will be sustained by electronic flow in the external circuit and ionic flow in the electrolyte.

In practice, a number of fuel cells are normally stacked or 'ganged' together to form a fuel cell assembly. The anode/electrolyte/cathode sub-unit is typically referred to as an 'electrode assembly' (EA). The cathode of the first EA is typically disposed next to the anode of a subsequent EA, but separated by a bipolar plate. The bipolar plate is typically carbon, chosen for its unique combination of properties; chemical inertness, electrical conductivity, rigidity and the ability to be machined. A network of channels are typically formed in the bipolar plate by mechanical machining to distribute the fuel and oxidant to the anode and cathode respectively. The bipolar plate provides electrical connection from one EA to the next, and also serves to isolate the anode fuel from the cathode oxidant in adjacent EA's. In order to further contain the fuel and keep it separate from the oxidant, a sealing means, such as an o-ring or other exterior gasket, is needed. Other traditional types of fuel cells use extremely complex stacking arrangements consisting of a membrane, gaskets, channels, electrodes and current collectors that are difficult and expensive to fabricate and assemble, and are highly subject to catastrophic failure of the entire system if a leak develops. As can be easily appreciated, the cost of fabricating and assembling fuel cells is significant, due to the materials and labor involved. Typically, 85% of a fuel cell's cost is attributable to manufacturing costs. Thus, the complexity of prior art fuel cell structures is one of the factors preventing widespread acceptance of fuel cell technology. An improved style of fuel cell that is less complex and less prone to failure would be a significant addition to the field.

BRIEF DESCRIPTION OF THE DRAWINGS

FIG. 1 is schematic representation of a typical fuel cell as practiced in the prior art.

DETAILED DESCRIPTION OF THE PREFERRED EMBODIMENT

A novel fuel cell has the fuel supply provided by chemisorbed hydrogen that is contained internally within the fuel cell, eliminating the need for external fuel supplies. The fuel cell has a plurality of sub-cells situated within the internal fuel supply. The sub-cells have a porous central core of a reticulated vitreous material that can be formed in the shape of a solid cylinder, for example. The porous central core serves to distribute the oxidant throughout the fuel cell. A cathode is situated coaxially around the porous central core, and has a catalytic layer on its outer side. A solid polymer electrolyte is situated coaxially around the electrode and in intimate contact with the catalytic layer. An anode is situated coaxially around the electrolyte, and a second layer of catalytic material is situated between the electrolyte and the anode. The internal fuel supply is situated coaxially around and in intimate contact with the anode. In operation, hydrogen is desorbed from the internal fuel supply, and passes through the anode to produce electricity. The internal fuel supply is arranged to distribute the desorbed hydrogen fuel throughout the fuel cell.

Figure 2:
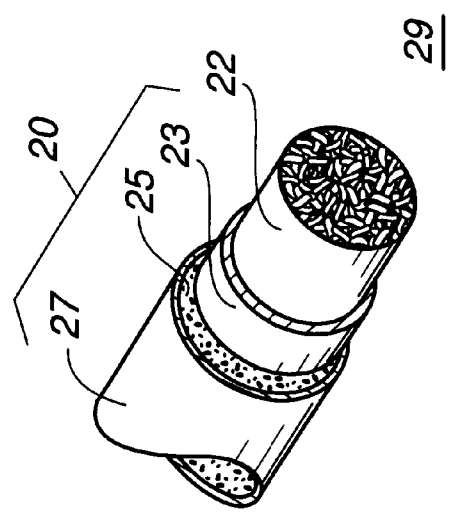
FIG. 2 is a detailed cut away view of a membrane electrode assembly in accordance with the invention.

Referring now to FIG. 2, the preferred embodiment of the invention utilizes a membrane electrode assembly (MEA) 20 that is wrapped around a porous central core 22 that serves as a support structure of sufficient strength to maintain its shape while under pressure. The support structure 22 is typically a cylindrical shape, but can also assume other configurations depending on the form factor desired in the final package. As used in the context of this disclosure, the terms 'cylindrical' or 'cylinder' means a structure having a generally solid cylindrical shape with a long axis down the center of the cylinder, the solid cylinder having any of a number of cross sections such as circular, elliptical, square, pentagonal, hexagonal, etc. The support structure 22 could also have a dynamically varying cross-sectional shape, resulting in a fuel cell of variable cross section. This may be desired for creating fuel cells that fit easily into a contoured package, for example a battery housing for a two-way radio. One preferred material for the porous central core is a reticulated vitreous aluminum matrix known as DUOCEL®, a trademark of ERG, Oakland, Calif. DUOCEL® is a rigid foam material, made from 6101-O aluminum alloy, and has densities from 6–8%, and is available in 10, 20 and 40 pores per inch (PPI). Other reticulated materials, such as carbon and other metals, are also available. One primary advantage of this material is that it is very rigid, thus providing a solid foundation to fabricate the fuel cell around. The porous central core also serves as the distributing medium for the oxidant. The oxidant, typically the ambient atmosphere, is introduced into the core at one end, and is distributed linearly throughout the fuel call by means of the myriad interconnected pores of the Duocel®.

Next, a first electrode material, or cathode, 23 overlies the porous central core 22. By coating the electrode onto the electrically conductive foamed metal, the central core 22 also functions as a current collector, thus eliminating the need for a separate current collector, as has been practiced in the prior art. The electrode material is preferably a woven cloth or paper composed of fibers having a high electrical conductivity. On the exterior surface of the cathode is disposed a suitable noble metal catalyst, such as platinum or alloys thereof, or any of the Group VIII metals or alloys containing Group VIII metals. Characteristics required for the cathode 23 include high electrical conductivity and gas permeability.

A solid polymer electrolyte material 25 is the next layer in the MEA. The solid polymer electrolyte is composed of an electrically insulating material that is gas-impermeable and ion-permeable. Suitable solid polymer electrolyte materials include films of perfluorinated sulfonic acids derived from fluorinated styrenes, quaternary amine polystyrene, NAFION® (trademark of E.I. DuPont de Nemours, Inc.), polybenzimidazole, or other ionomeric polymers. NAFION® is a sulfonated polyfluoroaliphatic hydrogel capable of absorbing water and of withstanding the chemical environment of the cell. NAFION® has superior mechanical strength, predictable dimensional changes, high electrical conductivity and the ability to transport the desired ions while rejecting undesired ions and molecules.

Next, we find another layer of a catalyst material. The catalysts for the anode may be chosen from the same group used for the previous catalyst. Overlying this is the anode 27, similar in construction to the previous electrode, but with suitable differences well known to those skilled in the art to make it an efficient anode. To review, the electrolyte 25 is sandwiched between the cathode 23 and the anode 27, with a catalyst layer on the sides of the electrodes that face the electrolyte. This cathode-electrolyte-anode system coaxially surrounds the porous central core to form a tubular MEA 29 that allows oxidant to be evenly distributed to the cathode.

Figure 3:
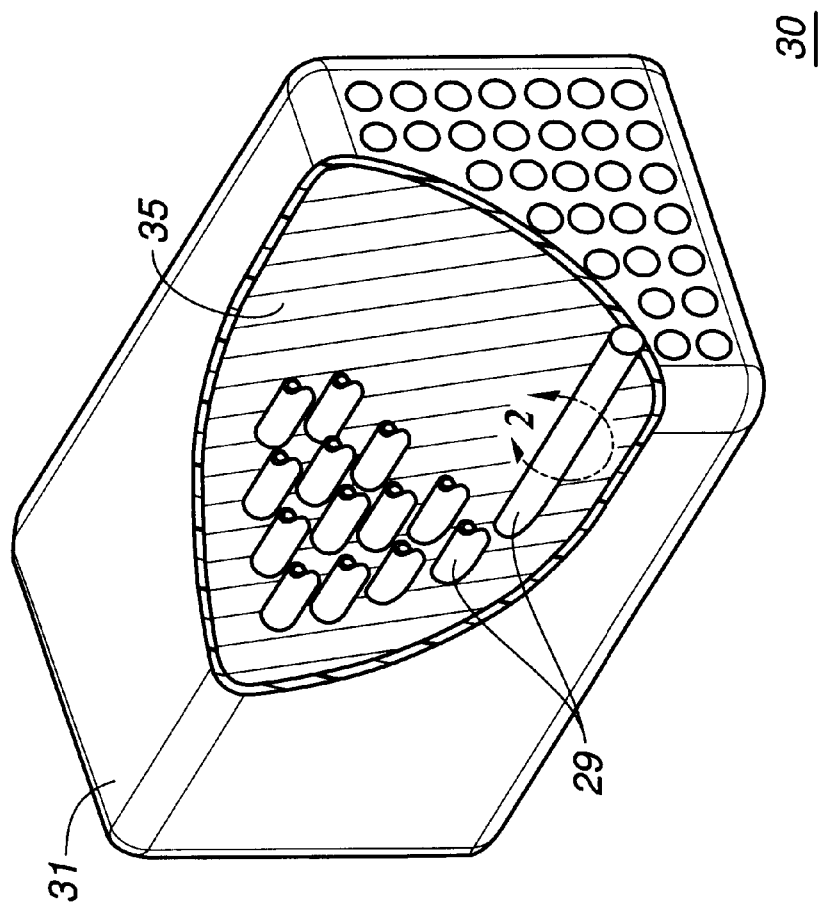
FIG. 3 is a cut-away view of a fuel cell with internal fuel supply, depicting the arrangement of the membrane electrode assemblies shown in FIG. 2, in accordance with the invention.

Referring now to FIG. 3, a plurality of the tubular MEA assemblies 29 are sealed inside a housing 31. The housing 31 is coaxially formed around the outside of the anode along the length of the cylinder so that the hydrogen can be evenly distributed to all surfaces of the anode 27. The tubes are sealed around the circumference of each end of the tube and mounted in such a way as to allow ambient air to enter the porous central core through the exposed ends. The outer surface (anode) of the MEA assemblies 29 serves as a barrier between the central core and the internal fuel storage medium 35. The fuel storage medium 35 is a conductive material that contains chemisorbed hydrogen or a metal hydride and is situated in the housing so that it fills the spaces between the MEA assemblies 29. Hydrogen absorbing materials are well known in the art. Hydrogen can be stored in layered nanostructures possessing some crystallinity, with interstices between 0.3 nm and 0.7 nm, and having chemisorption properties with respect to hydrogen at those surfaces of a nanostructure which define the interstices. Preferred nanostructures are carbon nanostructures such as carbon nanotubes, carbon fibrils, carbon nanoshells and carbon nanofibers. Hydrogen is chemisorbed into the interstices of the nanostructures. For further information on carbon nanostructures, the reader is referred to U.S. Pat. No. 5,653,951, which is incorporated herein by reference. Metal hydrides can store about 2–6.5 wt % hydrogen, activated carbon can store up to 8%, and carbon nanofibers up to 75 wt % hydrogen. The hydrogen that is chemisorbed onto the conductive matrix is subsequently desorbed to deliver hydrogen gas to the MEA, thus producing electricity in the fuel cell. When air passes through the porous central core and hydrogen is desorbed, an electrical potential is developed and power can be extracted from terminals (not shown) that are appropriately connected to the cell 30. Our invention stores the absorbed hydrogen in a solid matrix, which is much safer than conventional high pressure gas or liquid storage bottles. The housing 31 is designed to accommodate the expansion and contraction of the hydrogen absorbing material. This arrangement offers tremendous advantages in that the storage material is in intimate contact with the active anode area. Also, the bipolar plates, external fuel storage vessel, tubing, gas regulators, and valves commonly employed in conventional fuel cells are eliminated. In addition, the full active area of the MEA is utilized because no part is blocked by the flow field plate. The conduction path for the anode is through the conductive fuel storage medium 35. This arrangement eliminates the need for an additional current collecting screen that is present in conventional fuel cells, further reducing the part count, manufacturing complexity, and weight.

Our invention is highly customizable. Power density and energy density can be optimized for a particular application by varying the fuel storage volume versus the fuel cell active area. In summary, we have provided a fuel cell with an integral solid hydrogen storage medium that is inherently safer and more acceptable to consumers. A fuel cell offers significant advantages in portable electronics applications, such as longer lifetime on a single charge, and faster recharging times are possible.

While the preferred embodiments of the invention have been illustrated and described, it will be clear that the invention is not so limited, and other equivalents will occur to those skilled in the art without departing from the spirit and scope of the present invention.

What is claimed is:

1. A fuel cell with internal fuel storage, comprising:
    a membrane electrode assembly comprising:
        a gas impermeable, ion-permeable solid polymer electrolyte;
        a cathode disposed on and in intimate contact with one side of the solid polymer electrolyte;
        an anode disposed on and in intimate contact with another side of the solid polymer electrolyte;

the membrane electrode assembly formed around and disposed on a central core; and an electrically conductive fuel storage medium surrounding the membrane electrode assembly, the fuel storage medium comprising a solid material possessing chemisorbed hydrogen that is subsequently desorbed to provide fuel for the fuel cell; and a housing containing the membrane electrode assembly and the fuel storage medium.

2. The fuel cell as described in claim 1, wherein the central core is porous.

3. The fuel cell as described in claim 2, wherein the central core is reticulated vitreous metal or reticulated vitreous carbon.

4. The fuel cell as described in claim 1, wherein the central core is generally formed in the shape of a solid cylinder.

5. The fuel cell as described in claim 1, wherein oxidant passes through the central core.

6. The fuel cell as described in claim 5, wherein the oxidant is air and the fuel storage medium is a metal hydride.

7. The fuel cell as described in claim 1, further comprising a first noble metal catalyst disposed between the cathode and the solid polymer electrolyte and a second noble metal catalyst disposed between the solid polymer electrolyte and the anode.

8. The fuel cell of claim 1, wherein electrical energy is generated by the fuel cell when air is supplied to the central core.

9. The fuel cell as described in claim 1, wherein the solid polymer electrolyte is selected from the group consisting of polybenzimidazole and perfluorinated sulfonic acids derived from fluorinated styrene.

10. The fuel cell of claim 1, wherein the central core and the fuel storage medium function as current collectors.

11. A fuel cell with internal fuel storage, comprising:

a tubular membrane electrode assembly comprising a laminate of:
 a solid polymer electrolyte comprising polybenzimidazole or perfluorinated sulfonic acids derived from fluorinated styrene;
 a noble metal catalyst disposed on two opposing major sides of the solid polymer electrolyte;
 a cathode disposed on and in intimate contact with the noble metal catalyst on one side of the solid polymer electrolyte;
 an anode disposed on and in intimate contact with the noble metal catalyst on the other side of the solid polymer electrolyte; and
 said laminate formed about and disposed on a porous central core generally formed in the shape of a cylinder;

a solid fuel storage medium comprising a metal hydride or a material that chemisorbs hydrogen, said material selected from the group consisting of activated carbon, carbon nano-fibers and graphite;

the solid fuel storage medium being electrically conductive and surrounding the tubular membrane electrode assembly;

the tubular membrane electrode assembly and the solid fuel storage medium arranged within a housing such that end portions of the porous central core are exposed to ambient air on an exterior of the housing to provide oxygen to the tubular membrane electrode assembly, and the housing sealing the solid fuel storage medium within.

12. The fuel cell as described in claim 11, wherein the porous central core is reticulated vitreous metal or reticulated vitreous carbon.

13. The fuel cell of claim 11, wherein electrical energy is generated by the fuel cell when hydrogen gas is desorbed from the solid fuel storage medium and air is supplied to the porous central core.

14. The fuel cell of claim 11, wherein the solid fuel storage medium and the porous central core both function as current collectors.

15. A fuel cell having no external supply of fuel, comprising:

a plurality of central cores comprising a reticulated vitreous material generally formed in the shape of a solid cylinder, to provide ambient air to the fuel cell;

each of the plurality of central cores having a membrane electrode assembly disposed coaxially about the length of the cylinder, such that ends of the cylinder are not covered by the membrane electrode assembly;

a solid fuel storage medium having chemisorbed hydrogen that can be desorbed to provide hydrogen to the fuel cell;

the plurality of central cores situated within the solid fuel storage medium; and the plurality of central cores and the solid fuel storage medium arranged within a housing such that the ends of the cylinders that are not covered by the membrane electrode assembly are exposed to ambient air outside the housing in order to provide oxygen to the fuel cell, and such that the solid fuel storage medium is sealed within the housing.

16. The fuel cell of claim 15, wherein the solid fuel storage medium is selected from the group consisting of metal hydrides, activated carbon, carbon nano-fibers and graphite.

17. The fuel cell of claim 15, wherein electrical energy is generated by the fuel cell when hydrogen gas is desorbed from the fuel storage medium and air is supplied to the central core.

18. The fuel cell of claim 15, wherein there is no external source of fuel.

* * * * *